United States Patent
Shimoda (10) Patent No.: US 6,628,588 B2
(45) Date of Patent: Sep. 30, 2003

(54) INFORMATION RECORD APPARATUS, INFORMATION RECORD METHOD, AND INFORMATION RECORD MEDIUM

(75) Inventor: Yasuhisa Shimoda, Saitama (JP)

(73) Assignee: Pioneer Corporation, Tokyo (JP)

( * ) Notice: Subject to any disclaimer, the term of this patent is extended or adjusted under 35 U.S.C. 154(b) by 160 days.

(21) Appl. No.: 09/962,332

(22) Filed: Sep. 26, 2001

(65) Prior Publication Data

US 2002/0036963 A1 Mar. 28, 2002

(30) Foreign Application Priority Data

Sep. 26, 2000 (JP) .................... P.2000-292360

(51) Int. Cl.$^7$ .............................. G11B 7/00
(52) U.S. Cl. .................... 369/47.53; 369/116
(58) Field of Search .................. 369/116, 47.53, 369/47.52, 47.51, 47.5

(56) References Cited

U.S. PATENT DOCUMENTS

| | | | |
|---|---|---|---|
| 5,309,461 A | 5/1994 | Call et al. ............. 372/38 |
| 5,436,880 A | 7/1995 | Eastman et al. ......... 369/54 |
| 5,537,383 A | 7/1996 | Gage et al. ............ 369/116 |
| 5,903,537 A | 5/1999 | Gage et al. ............ 369/116 |
| 6,269,062 B1 * | 7/2001 | Minemura et al. ....... 369/116 |

FOREIGN PATENT DOCUMENTS

| EP | 0 712 130 A1 | 5/1996 |
|---|---|---|
| JP | 09 091 705 A | 4/1997 |

* cited by examiner

Primary Examiner—Nabil Hindi
(74) Attorney, Agent, or Firm—Morgan, Lewis & Bockius LLP (57) ABSTRACT

To record a pit in an optical information record medium, the modulation depth of the record pit is compared with a predetermined threshold value and write light power corresponding to the modulation depth of a larger value than the threshold value and corresponding to the β value closest to the target β value, of the actually found values is determined appropriate write light power, whereby power calibration for optical disk DSK is conducted. Emission power (write light power) corresponding to the β values in a predetermined range, of the actually found β values and corresponding to the modulation depth of the largest value is determined appropriate write light power, whereby power calibration is conducted.

10 Claims, 9 Drawing Sheets

| DISK TYPE (k) | TARGET β VALUE DATA $\beta k$ | MODULATION DEPTH THRESHOLD VALUE DATA $THDk$ |
|---|---|---|
| OPTICAL DISK A (k = 1) | $\beta 1$ | THD1 |
| OPTICAL DISK B (k = 2) | $\beta 2$ | THD2 |
| OPTICAL DISK C (k = 3) | $\beta 3$ | THD3 |
| OPTICAL DISK D (k = 4) | $\beta 4$ | THD4 |

| DISK TYPE (k) | TARGET MODULATION DEPTH DATA Mk | β VALUE RANGE DATA Wk |
|---|---|---|
| OPTICAL DISK A (k = 1) | M1 | W1 |
| OPTICAL DISK B (k = 2) | M2 | W2 |
| OPTICAL DISK C (k = 3) | M3 | W3 |
| OPTICAL DISK D (k = 4) | M4 | W4 |

INFORMATION RECORD APPARATUS, INFORMATION RECORD METHOD, AND INFORMATION RECORD MEDIUM

BACKGROUND OF THE INVENTION

1. Field of the Invention

This invention relates to an information record apparatus for performing power calibration when recording information on an optical information record medium such as a write-once optical disk or a rewritable optical disk, for example, a power calibration method at the information recording time, and an optical information record medium recording information to perform power calibration.

2. Description of the Related Art

In recent years, in addition to read-only CD (compact disk) and DVD (digital video disk or digital versatile disk), write-once (recordable) CD and DVD, rewritable CD and DVD, MD (mini disk), and the like have been developed for increasing the number of variations of the optical information record media.

In write-once (recordable) CD and DVD, which will be hereinafter collectively called write-once optical disk, write laser light is applied to a record film of an organic coloring matter material for forming circular or elliptic record pits, thereby irreversibly recording information. In rewritable CD and DVD, which will be hereinafter collectively called rewritable optical disk, write laser light is applied to a phase change film for repeating crystallization and rendering amorphous, thereby reversibly recording information as circular or elliptic record pits. In MD, magneto-optical recording is performed.

To form an appropriate circular or elliptic record pit defined on the specification on write-once optical disk and rewritable optical disk, write laser light is controlled by light pulse strategy.

In the light pulse strategy, the form of a light pulse relative to the record mark length is adjusted, whereby laser light emitted from a semiconductor laser is optimized, and record pits of an appropriate form are formed by the optimized laser light, so that a high-quality reproduction signal with occurrence of jitter, etc., suppressed can be provided when information is reproduced.

Power calibration to previously adjust the emission power of the semiconductor laser is executed before essential information recording is performed based on the light pulse strategy.

In the power calibration, record pits are formed in a power calibration area provided at the inner radius of an optical disk and the emission power of the semiconductor laser is optimized based on the waveform provided, for example, by AC coupling a detection signal, called HF signal, provided by optically reading the record pits formed (namely, written for a try) in the power calibration area.

That is, as with the case where normal information reading is executed, reflected light from the power calibration area in which the recordpits are formed is detected by a photo detector and outputs of the photo detector are combined, whereby the HF signal is generated. This means that the HF signal is a signal before equalizing to generate an RF signal, etc., is performed.

Figure 12A:
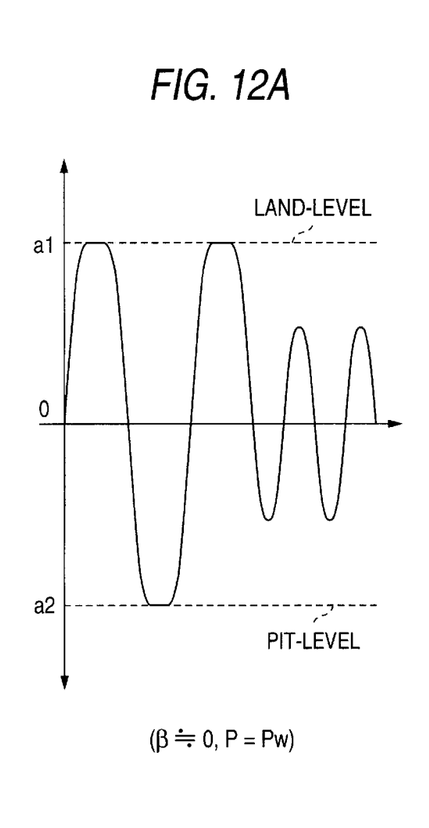
FIGS. 12A to 12C are drawings to describe a calculation method of a β value.

As the HF signal is thus generated, an eye pattern of the HF signal is provided. If the waveform is AC-coupled, top peak level a1 of the waveform indicates the potential difference between the potential indicating the strength of reflected light from a land where no record pit is formed and the potential of AC ground GND and bottom peak level a2 indicates the potential difference between the potential indicating the strength of reflected light from a record pit and the potential of AC ground GND, as shown in FIG. 12A.

Figure 12B:
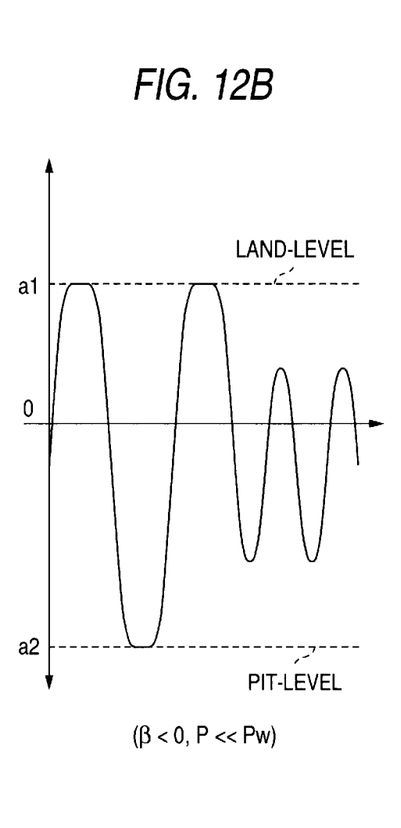
Figure 12C:
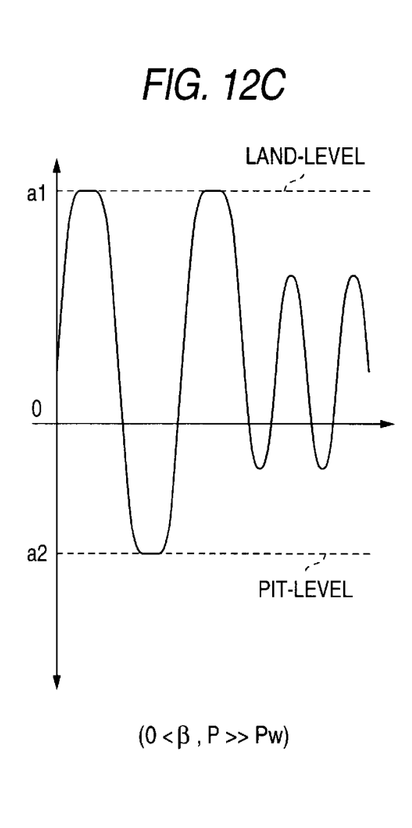

The ratio between the peak-to-peak value of the HF signal (a1+a2) and the difference between the levels (a1−a2), which will be hereinafter referred to as $\beta$ value, is found as shown in the following expression (1), and, for example, when $\beta$ value=0 is adopted as the target of the power calibration, if the $\beta$ value becomes almost 0, it is determined that the emission power P of the semiconductor laser is equal to target power Pw; if the waveform provided by AC coupling the HF signal becomes the waveform shown in FIG. 12B and the $\beta$ value becomes a negative value, it is determined that the emission power P of the semiconductor laser is smaller than the target power Pw; and if the waveform provided by AC coupling the HF signal becomes the waveform shown in FIG. 12C and the $\beta$ value becomes a positive value, it is determined that the emission power P of the semiconductor laser is larger than the target power Pw. The emission power P of the semiconductor laser is adjusted so as to become equal to the target power Pw based on each determination result.

$$\beta = (a1-a2)/(a1+a2) \quad (1)$$

A method of determining whether or not the emission power P of the semiconductor laser reaches the target power Pw by examining asymmetry of the HF signal itself produced in response to the size and form of a recordpit formed in the power calibration area is also devised.

Figure 13:
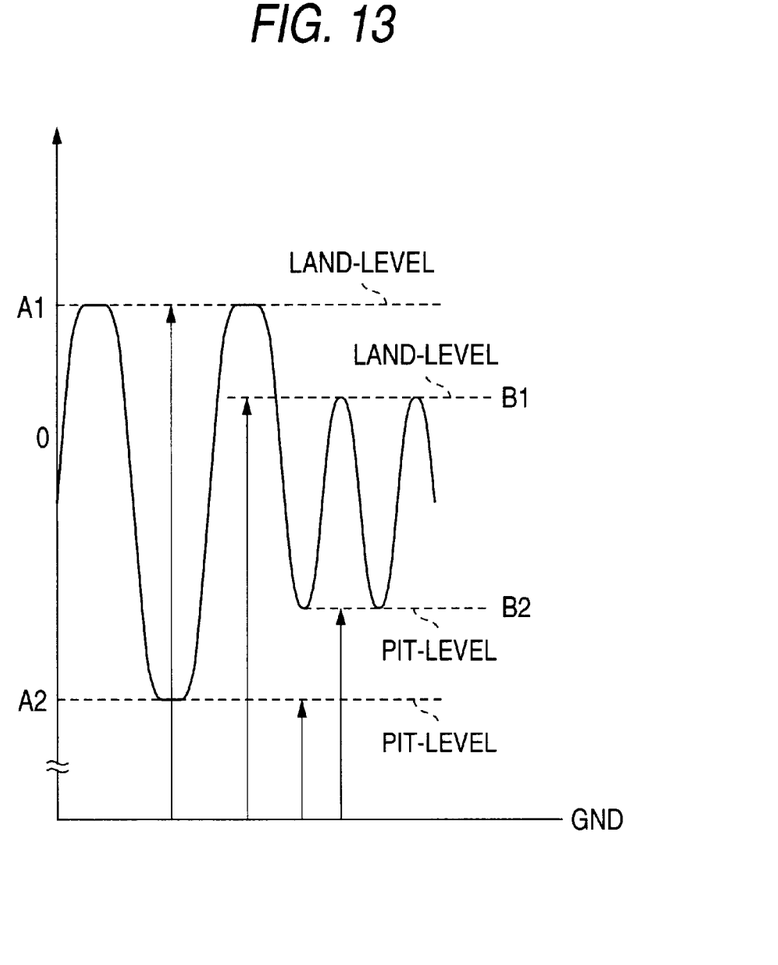
FIG. 13 is a drawing to describe a calculation method of a value of asymmetry.

In the method of examining asymmetry, as shown in FIG. 13, top peak level A1 of the HF signal corresponding to the strength of reflected light from a land where no record pit is formed, bottom peak level A2 corresponding to the strength of reflected light from a large record pit, top peak level B1 corresponding to the strength of reflected light from a land between small recordpits, and bottompeak level B2 corresponding to the strength of reflected light from a small record pit are detected and the detected levels A1, A2, B1, and B2 are applied to the following expression (2), thereby finding the value of asymmetry, which will be hereinafter referred to as a value:

$$\alpha = \{(A1+A2)-(B1+B2)\}/\{2\times(A1-A2)\} \quad (2)$$

For example, when $\alpha$ value=0 is adopted as the target of the power calibration, if the a value becomes 0, it is determined that the emission power P of the semiconductor laser is equal to the target power Pw, and if the a value becomes unequal to 0, it is determined that the emission power P is not equal to the target power Pw, and the supply current to the semiconductor laser is controlled so that the emission power P becomes equal to the target power Pw.

When a pit is recorded and formed on an optical disk, the specification of modulation depth M found according to the following expression (3) must also be satisfied:

$$M = (A1-A2)/A1 \quad (3)$$

However, the $\beta$ value and the a value fluctuate depending on the type difference between optical disks, the pulse strategy, the characteristic variations, etc., of the optical systems and electronic elements contained in pickups and thus, if the emission power of the semiconductor laser is previously adjusted based on the $\beta$ value and the a value by the power calibration described above, the modulation depth may not be provided and when record pits are formed at the essential information recording time and the information is reproduced, the modulation depth is degraded and jitter, etc., accompanying the degradation of the modulation depth occurs in the reproduction signal; this is a problem. That is, it may become difficult to optimize the emission power of the semiconductor laser with good accuracy as the power calibration based on the β value and the a value in the related art is executed.

SUMMARY OF THE INVENTION

It is therefore an object of the invention to provide an optical information record apparatus and an optical information record method for making it possible to overcome the above-described problems and recording and forming pits in appropriate form.

It is another object of the invention to provide an information record medium recording control information to record and form pits in appropriate form for controlling an electronic machine based on the control information.

To the ends, according to the invention, there is provided an information record apparatus for adjusting power of write light on to an optical information record medium, the information record apparatus comprising a light source for emitting the write light, a power adjustment section for adjusting the emission power of the write light, a write section for forming recordpits in the optical in formation record medium by applying write light of different powers emitted from the light source, a feature extraction section for optically reproducing the record state containing the record pits formed by applying the write light of different powers from the optical information record medium in which the record pits are formed and extracting feature information of the record state for each of the record pits formed by applying the write light of different powers based on the signal waveform provided by optically reproducing the record state, a detection section for detecting the modulation depth of the write light for each of the different powers based on the signal waveform provided by optically reproducing the record state, a selection section for selecting the power of the write light corresponding to the modulation depth of a larger value than a predetermined threshold value, of the modulation depths detected by the detection section, and a determination section for selecting the feature information corresponding to the power of the light write selected by the selection section from among the feature information extracted by the feature extraction section and determining that the power of the write light corresponding to the feature information closest to target feature information of a predetermined record state, of the selected feature information is appropriate write light power, characterized in that the power adjustment section adjusts the emission power of the light source based on the write light power determined to be appropriate bathe determination section.

According to the information record apparatus having the configuration, each actually provided modulation depth is compared with the predetermined threshold value and the emission power (write light power) corresponding to the modulation depth of a larger value than the modulation depth and corresponding to the feature information closest to the target feature information is determined appropriate write light power, whereby power calibration is conducted.

According to the invention, there is provided an information record apparatus for adjusting power of write light onto an optical information record medium, the information record apparatus comprising a light source for emitting the write light, a power adjustment section for adjusting the emission power of the write light, a write section for forming record pits in the optical information record medium by applying write light of different powers emitted from the light source, a feature extraction section for optically reproducing the record state containing the record pits formed by applying the write light of different powers from the optical information record medium in which the record pits are formed and extracting feature information of the record state for each of the record pits formed by applying the write light of different powers based on the signal waveform provided by optically reproducing the record state, a detection section for detecting the modulation depth of the write light for each of the different powers based on the signal waveform provided by optically reproducing the record state, a selection section for selecting the power of the write light corresponding to the feature information in a predetermined range, of the feature information extracted by the feature extraction section, and a determination section for determining that the power of the write light, of the powers of the write light selected by the selection section, corresponding to the modulation depth of the largest value, of the modulation depths detected by the detection section is appropriate write light power, characterized in that the power adjustment section adjusts the emission power of the light source based on the write light power determined to be appropriate by the determination section.

According to the information record apparatus having the configuration, the emission power (write light power) corresponding to the feature information in the predetermined range, of actually provided feature information and corresponding to the modulation depth of the largest value, of the emission power is determined appropriate write light power, whereby power calibration is conducted.

According to the invention, there is provided an information record method for adjusting power of write light onto an optical information record medium, the information record method comprising the steps of forming record pits in the optical information record medium by applying write light of different powers emitted from a light source, optically reproducing the record state containing the record pits formed by applying the write light of different powers from the optical information record medium in which the record pits are formed and extracting feature information of the record state for each of the recordpits formed by applying the write light of different powers based on the signal waveform provided by optically reproducing the record state, detecting the modulation depth of the write light for each of the different powers based on the signal wave form provided by optically reproducing the record state, selecting the power of the write light corresponding to the modulation depth of a larger value than a predetermined threshold value, of the detected modulation depths, selecting the feature information corresponding to the selected write light power from among the extracted feature information and determining that the power of the write light corresponding to the feature information closest to target feature information of a predetermined record state, of the selected feature information is appropriate write light power, and adjusting the emission power of the light source based on the write light power determined to be appropriate.

According to the information record method, each actually provided modulation depth is compared with the predetermined threshold value and the emission power (write light power) corresponding to the modulation depth of a larger value than the modulation depth and corresponding to the feature information closest to the target feature information is determined appropriate write light power, whereby power calibration is conducted.

According to the invention, there is provided an information record method for adjusting power of write light onto an optical information record medium, the information record method comprising the steps of forming record pits in the optical information record medium by applying write light of different powers emitted from a light source, optically reproducing the record state containing the record pits formed by applying the write light of different powers from the optical information record medium in which the record pits are formed and extracting feature information of the record state for each of the recordpits formed by applying the write light of different powers based on the signal waveform provided by optically reproducing the record state, detecting the modulation depth of the write light for each of the different powers based on the signal wave form provided by optically reproducing the record state, selecting the power of the write light corresponding to the feature information in a predetermined range, of the extracted feature information, determining that the power of the write light, of the selected write light powers, corresponding to the modulation depth of the largest value, of the detected modulation depths is appropriate write light power, and adjusting the emission power of the light source based on the write light power determined to be appropriate.

According to the information record method, the emission power (write light power) corresponding to the feature information in the predetermined range, of actually provided feature information and corresponding to the modulation depth of the largest value, of the emission power is determined appropriate write light power, whereby power calibration is conducted.

According to the invention, there is provided an information record medium recording control information for controlling an information record apparatus for recording information by applying write light emitted from a light source to an optical information record medium, the control information for adjusting power of the write light, the control information for controlling the information record apparatus, thereby emitting write light of different powers from the light source for forming record pits in the optical information record medium, and optically reproducing the record state containing the record pits formed by applying the write light of different powers from the optical information record medium in which the record pits are formed, extracting feature information of the record state for each of the record pits formed by applying the write light of different powers based on the signal waveform provided by optically reproducing the record state, detecting the modulation depth of the write light for each of the different powers based on the signal waveform provided by optically reproducing the record state, selecting the power of the write light corresponding to the modulation depth of a larger value than a predetermined threshold value, of the detected modulation depths, selecting the feature information corresponding to the selected write light power from among the extracted feature information and determining that the power of the write light corresponding to the feature information closest to target feature information of a predetermined record state, of the selected feature information is appropriate write light power, and adjusting the emission power of the light source based on the write light power determined to be appropriate.

According to the information record medium, if the recorded control information is executed in an electronic machine such as a personal computer, it is made possible to emulate the function of the information record apparatus implemented as hardware.

According to the invention, there is provided an information record medium recording control information for controlling an information record apparatus for recording information by applying write light emitted from a light source to an optical information record medium, the control information for adjusting power of the write light, the control information for controlling the information record apparatus, thereby emitting write light of different powers from the light source for forming recordpits in the optical information record medium, and optically reproducing the record state containing the record pits formed by applying the write light of different powers from the optical information record medium in which the record pits are formed, extracting feature information of the record state for each of the record pits formed by applying the write light of different powers based on the signal waveform provided by optically reproducing the record state, detecting the modulation depth of the write light for each of the different powers based on the signal waveform provided by optically reproducing the record state, selecting the power of the write light corresponding to the feature information in a predetermined range, of the extracted feature information, determining that the power of the write light, of the selected write light powers, corresponding to the modulation depth of the largest value, of the detected modulation depths is appropriate write light power, and adjusting the emission power of the light source based on the write light power determined to be appropriate.

Also according to the information record medium, if the recorded control information is executed in an electronic machine such as a personal computer, it is made possible to emulate the function of the information record apparatus implemented as hardware.

DETAILED DESCRIPTION OF THE PRESENT INVENTION

Referring now to the accompanying drawings, there are shown preferred embodiments of the invention.

First Embodiment

Figure 1:
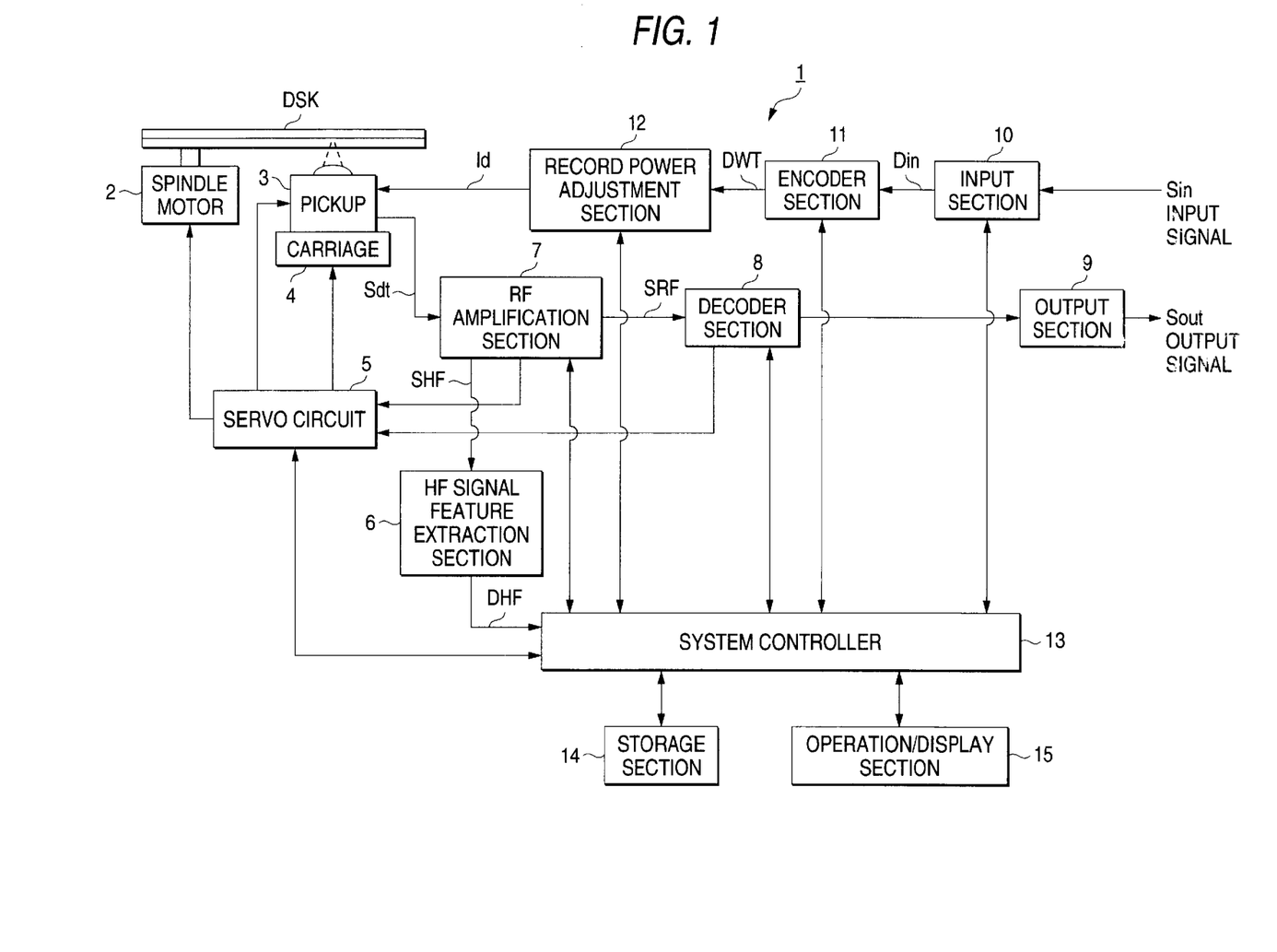
FIG. 1 is a block diagram to show the configuration of an information record apparatus of a first embodiment of the invention.

FIG. 1 is a block diagram to show the configuration of an information record apparatus 1 of a first embodiment.

In the figure, the information record apparatus 1 comprises a spindle motor 2, a pickup 3, and a carriage 4 on which the pickup 3 is mounted.

The spindle motor 2 is spindle-servoed by a servo circuit 5 and rotates a write-once or rewritable optical disk DSK placed at a clamp position at a predetermined linear speed.

The pickup 3 comprises a semiconductor laser (not shown), an optical system (not shown) comprising an object lens, and a photodetector (not shown) formed of a photodiode, etc.

To record information, write laser light of predetermined power optimized by light pulse strategy is emitted from the semiconductor laser and is made to converge by the optical system, whereby a write light beam is generated, and a spot of the write light beam is applied to the optical disk DSK through the object lens for forming a record pit in a record film of the optical disk DSK.

When information is reproduced, read laser light of predetermined power is emitted from the semiconductor laser and is made to converge by the optical system, whereby a read light beam is generated, and a spot of the read light beam is applied to the optical disk DSK through the object lens. Reflected light from the optical disk DSK is gathered by the optical system and the photodetector executes photoelectric conversion of the reflected light and supplies the conversion result to an RF amplification section 7, which then generates an information detection signal of the optical disk DSK, which will be hereinafter referred to as HF signal, and supplies the signal to an HF signal feature extraction section 6, a modulation depth detection section 16, and an already recorded part detection section 17.

The carriage 4 is carriage-servoed by the servo circuit 5 and moves the pickup 3 in the direction of the radius of the optical disk DSK.

The pickup 3 is provided with an actuator (not shown) for driving the object lens contained in the optical system and the servo circuit 5 controls the actuator, there by performing focus servo and tracking servo.

In addition to the HF signal feature extraction section 6, the RF amplification section 7, the modulation depth detection section 16, and the already recorded part detection section 17, the information record apparatus 1 further comprises a decoder section 8, an output section 9, an input section 10, an encoder section 11, a record power adjustment section 12, a system controller 13, a storage section 14, and an operation/display section 15.

The system controller 13 has a microprocessor or microprocessing unit (MPU) and performs centralized control of the whole operation of the information record apparatus 1 in addition to control of power calibration described later by executing a predetermined system program.

The storage section 14 is implemented as nonvolatile memory of SRAM etc., and stores n pieces of variable data (Dc1k, Dc2k, ..., Dcnk) to variably set the emission power of the semiconductor laser at n steps. In the embodiment, n=15 steps.

Figure 2:
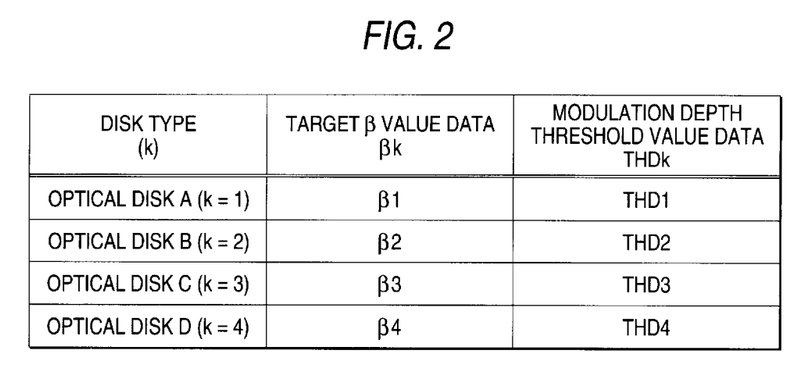
FIG. 2 is a drawing to show data stored in a storage section in the first embodiment of the invention.

Further, the storage section 14 stores target β value data βk and modulation depth threshold value data THDk for each optical disk DSK type k, as shown in FIG. 2.

Here, the target β value data βk is data indicating each β value when calculation of the expression (1) shown above is performed based on the HF signal recorded in a state in which the record state of each type of optical disk satisfies the predetermined specification and a sufficient margin is taken for variations in record state; the target β value data βk is previously found by experiment.

As for the modulation depth threshold value data THDk, as the target β value data βk is found, calculation of the expression (3) shown above is performed based on the HF signal recorded in a state in which the record state of each type of optical disk satisfies the predetermined specification and a sufficient margin is taken for variations in record state to find target modulation depth MMk, and the modulation depth of a smaller value than the target modulation depth MMk by a predetermined value mk (MMk-mk) is adopted as the modulation depth threshold value data THDk. The letter k denotes the optical disk type.

The operation/display section 15 comprises an operation section for the user to perform entry operation of starting to record information, etc., and a display section for displaying the operation status, an operation menu, etc., of the information record apparatus 1.

The input section 10 performs preprocessing of converting an external input signal Sin at the information recording time into digital input data Din, etc., and the encoder section 11 EFM-modulates the digital input data Din, etc., thereby generating record data DWT.

The record power adjustment section 12 generates an optimum pulse by light pulse strategy from the record data DWT, generates a current Id of a pulse train based on the optimum pulse, and supplies the current Id to the semiconductor laser in the pickup for emitting write laser light.

When information is recorded, the record power adjustment section 12 generates the current Id of a pulse train by the light pulse strategy and drives the semiconductor laser in the pickup, thereby emitting pulse-like write laser light; when information is reproduced, the record power adjustment section 12 supplies a current Id of a constant value to the semiconductor laser, thereby emitting read laser light of constant power.

When a photoelectric conversion signal Sdt is input from the photodetector placed in the pickup 3 to the RF amplification section 7, the RF amplification section 7 outputs an HF signal SHF and the HF signal feature extraction section 6 AC-couples the HF signal SHF and detects levels.

That is, top peak level a1 corresponding to the potential difference between the potential indicating the strength of reflected light from a land where no record pit is formed and the potential of AC ground GND and bottom peak level a2 corresponding to the potential difference between the potential indicating the strength of reflected light from a record pit and the potential of AC ground GND are detected, as shown in FIG. 12A, and detection data DHF is supplied to the system controller 13.

The system controller 13 performs calculation of the expression (1) shown above based on the detection data DHF to find a β value. That is, trial write (described later) is executed onto the optical disk DSK and based on the waveform of the HF signal SHF provided by reproducing information from the optical disk DSK, the feature information is supplied to the system controller 13 as the detection data DHF and the feature information of the record state of the optical disk DSK is found as the β value.

The RF amplification section 7 generates an RF signal SRF from the generated HF signal SHF and supplies the RF signal SRF to the decoder section 8, which then performs processing of EFM demodulation, etc., for the RF signal SRF and supplies the result to the output section 9, which then performs processing of D/A conversion, etc., for the data from the decoder section 8 and outputs an output signal Sout.

The RF amplification section 7 generates an error signal of a focus error, a tracking error, and the like from the photoelectric conversion signal Sdt and supplies the error signal to the servo circuit 5, whereby various servos such as focus servo and tracking servo are performed.

The modulation depth detection section 16 detects top peak level A1 of the waveform of the HF signal SHF from the RF amplification section 7 and bottom peak level A2, as shown in FIG. 13, and supplies detection data DRF to the system controller 13.

The system controller 13 performs the calculation of the expression (3) shown above based on the detection data DRF, thereby finding actual modulation depth.

The already recorded part detection section 17 detects the level of the amplitude of the HF signal SHF from the RF amplification section 7 and compares the detected level with a previously defined level and then discriminates an unrecorded portion and an already recorded portion from each other based on the comparison result.

Next, the operation of the described information record apparatus 1, mainly the operation for performing power calibration to optimize the emission power of the semiconductor laser placed in the pickup 3 will be discussed. The power calibration operation for recording information on CD-R will be discussed as a typical example.

Figure 3:
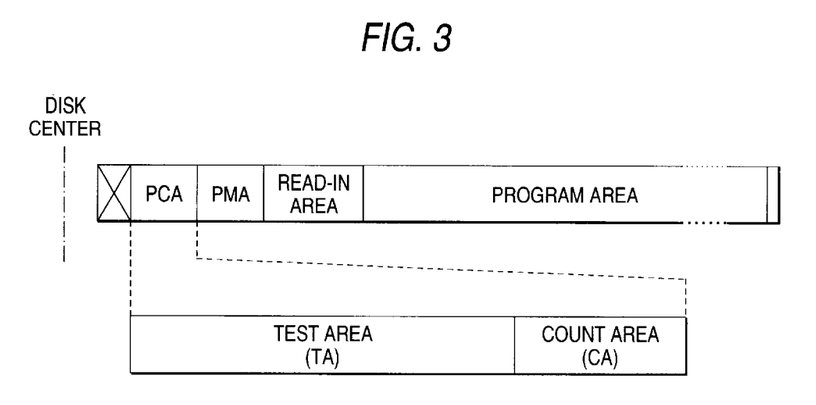
FIG. 3 is a drawing to show the format of a calibration area of CD-R.

First, as shown in FIG. 3, in CD-R, a power calibration area PCA is previously allocated to a portion on the disk center side (at the inner radius of the optical disk) from a read-in area, and is made up of a test area TA and a count area CA.

The test area TA is provided for forming a record pit as trial write by write laser light of each power when the emission power P of the semiconductor laser is changed at n steps.

On the other hand, in the count area CA, one frame is recorded in one trial write to count the number of records already made in the test area TA.

Figure 4:
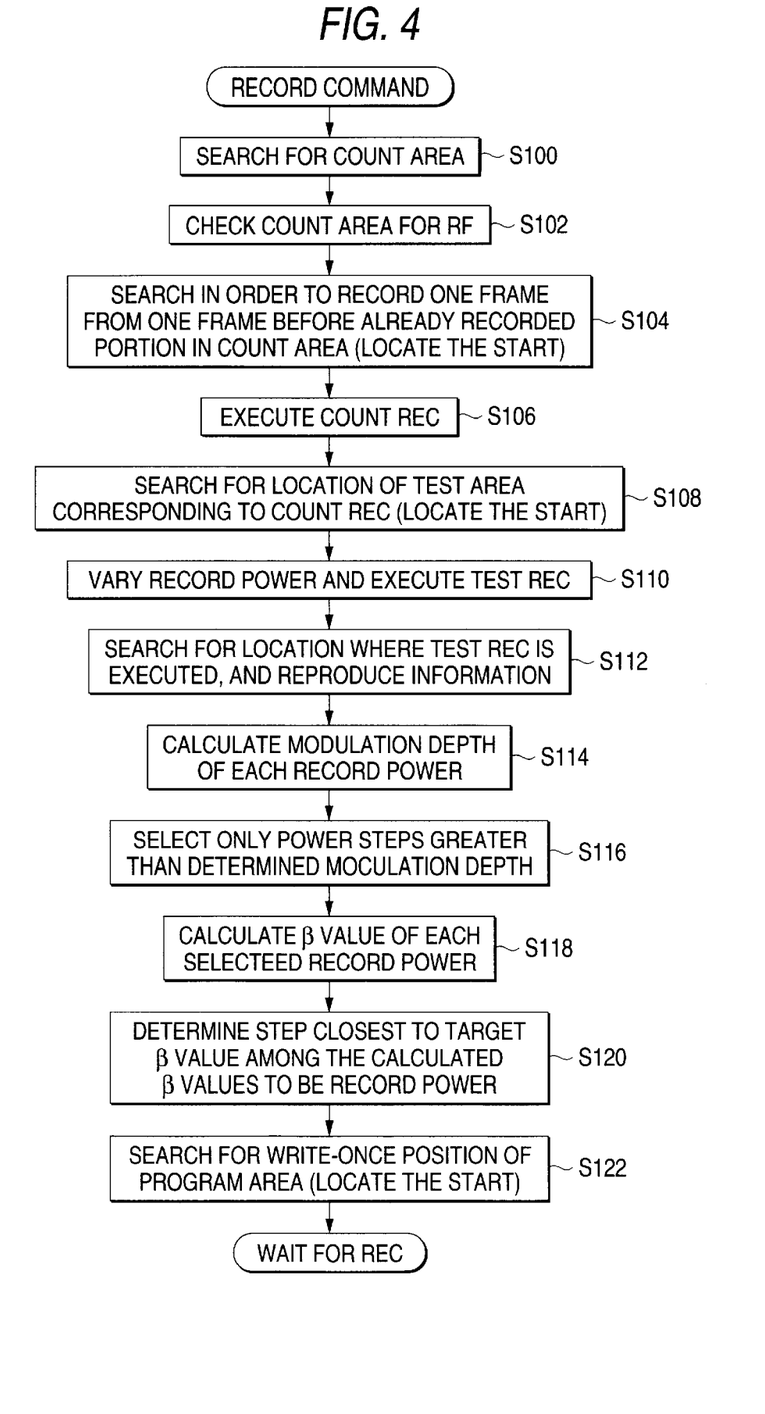
FIG. 4 is a flowchart to describe the operation of the first embodiment of the invention.

FIG. 4 is a flowchart to describe the power calibration operation. When the user gives a record start command, power calibration is conducted under the control of the system controller 13.

In the figure, first the pickup 3 is moved to the count area CA (step S100). Next, the HF signal SHF is input to the already recorded part detection section 17 and a provided detection signal is used to reproduce the count area CA, thereby checking an already recorded part (step S102).

Next, a search is made for the top position to record one frame from one frame before the portion wherein data is already recorded in the count area CA. That is, the start is located (step S104).

Next, the information record apparatus 1 is set to an information record mode and to count the number of use times of the test area TA, one frame length is recorded in the count area CA (step S106) and then the information record apparatus 1 is again set to an information reproduction mode before the pickup 3 is moved to the location of the test area TA corresponding to the above-mentioned frame recorded in the count area CA (step S108).

Next, at step S110, the information record apparatus 1 is again set to the information record mode and the system controller 13 acquires n variable data pieces corresponding to the CD-R stored in the storage section 14 (Dc11, Dc21, . . . , Dcn1) and supplies the variable data pieces (Dc11, Dc21, . . . , Dcn1) to the record power adjustment section 12 in order every predetermined time, whereby the emission power P of the semiconductor laser is varied in the order of Pc1k, Pc2k, . . . , Pcnk and record pits at n steps are recorded and formed in the test area TA.

Next, at step S112, the information record apparatus 1 is again set to the information reproduction mode and the pickup 3 is moved to the location where the record pits at n steps are recorded, and information is reproduced, whereby information of the recordpits formed as trail write is detected.

Here, the HF signal feature extraction section 6 detects the levels of the waveform of the HF signal SHF, detects the top peak level a1 corresponding to the potential difference between the potential indicating the strength of reflected light from a land where no record pit is formed and the potential of AC ground GND and the bottom peak level a2 corresponding to the potential difference between the potential indicating the strength of reflected light from a record pit and the potential of AC ground GND, and supplies the detection data DHF indicating the detection results to the system controller 13, as described above. The detection data DHF indicating the top peak level a1 and the bottom peak level a2 corresponding to the potential difference between the potential indicating the strength of reflected light from the record pit and the potential of AC ground GND is supplied to the system controller 13 for each of the record pits at the n steps.

Further, the modulation depth detection section 16 supplies the detection data DRF of the top peak level A1 and the bottom peak level A2 of the HF signal SHF to the system controller 13 for each of the record pits at the n steps.

Figure 5:
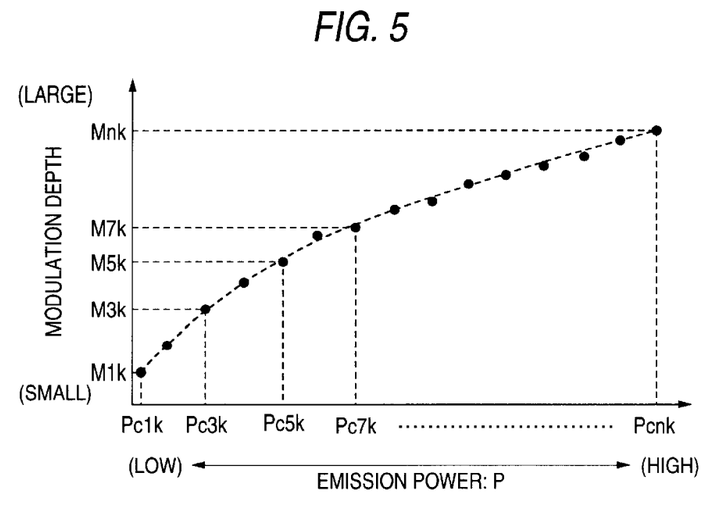
FIG. 5 is a drawing to show modulation depth data pieces generated in the first embodiment of the invention in a one-to-one correspondence with emission power steps.

Next, at step S114, the system controller 13 calculates actual n modulation depths M1k to Mnk based on the detection data DRF at the n steps. Accordingly, a distribution curve of the modulation depths M1k to Mnk as shown in FIG. 5 is provided.

Next, at step S116, the modulation depth threshold value data THDL corresponding to the CD-R is acquired from the storage section 14 and a modulation depth of a larger value than the value of the modulation depth threshold value data THD1 is selected from among the modulation depths M1k to Mnk and further the emission power corresponding to each selected modulation depth is selected.

Figure 6:
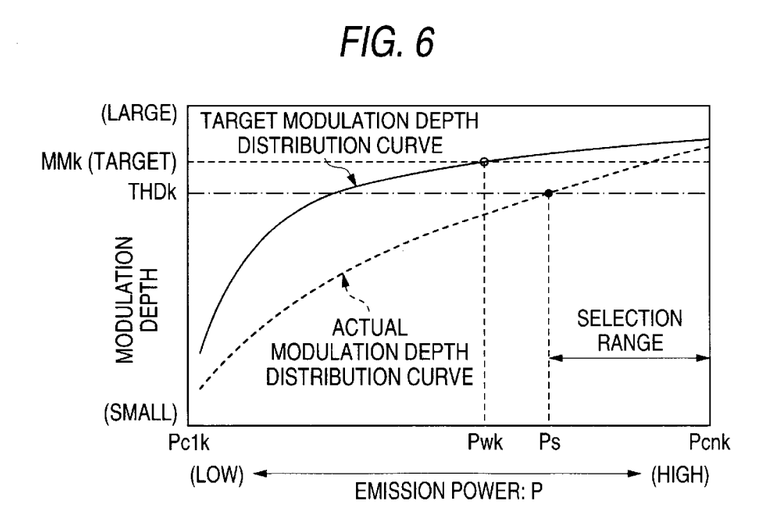
FIG. 6 is a drawing to describe the operation for selecting a predetermined modulation depth based on modulation depth threshold value data from among the actual modulation depths generated in the first embodiment of the invention.

More particularly, as shown in FIG. 6, the modulation depth distribution curve provided from the actual modulation depths M1k to Mnk is compared with the modulation depth threshold value data THD1 and emission powers Ps to Pcnk contained in the range of the modulation depths larger than the modulation depth threshold value data THD1 are selected and further the variable data pieces corresponding to the emission powers Ps to Pcnk are selected from among the variable data pieces (Dc11, Dc21, . . . , Dcn1) of the CD-R.

Next, at step S118, the calculation of the expression (1) shown above is performed based on each detection data DHF provided corresponding to the selected variable data pieces (namely, the variable data pieces corresponding to the emission powers Ps to Pcnk), thereby finding the β value for each power. For example, if the variable data pieces corresponding to the emission powers Ps to Pcnk are Dc7k to Dcnk, the β values corresponding to the variable data pieces Dc7k to Dcnk are calculated based on each detection data DHF provided corresponding to the variable data pieces Dc7k to Dcnk.

Figure 7:
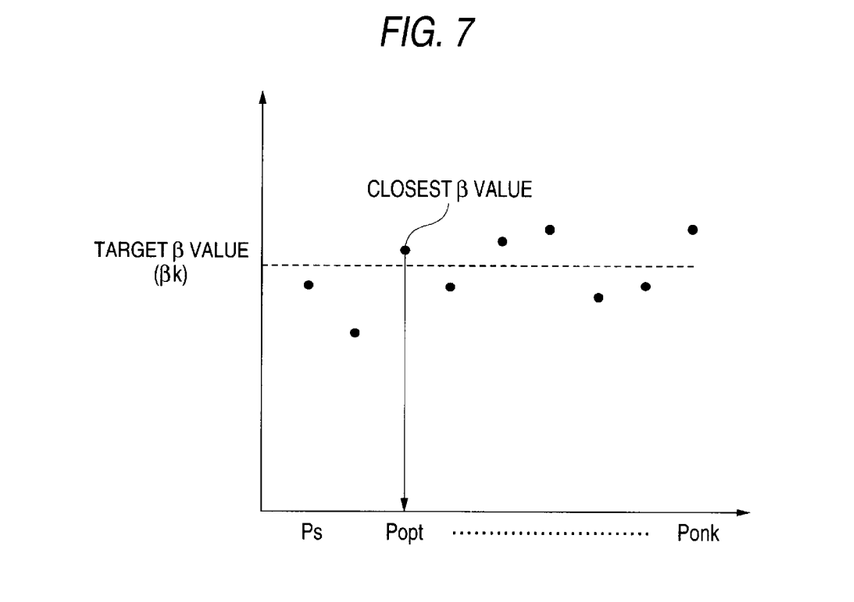
FIG. 7 is a drawing to describe the operation for determining the optimum emission power in the first embodiment of the invention.

Next, at step S120, the targe β value data β1 corresponding to the CD-R is acquired from the storage section 14 and as shown in FIG. 7, each of the β values corresponding to the selected emission powers Ps to Pcnk is compared with the target β value data β1 (namely, βk=β1) and the β value of the value closest to the target β value data β1 is selected. The emission power corresponding to the β value of the value closest to β1 is determined optimum emission power Popt and further one variable data piece corresponding to the optimum emission power Popt is selected from among the variable data pieces (Dc11, Dc21, . . . , Dcn1) of the CD-R. The selected variable data piece is adopted as the data to set the optimum emission power (optimum data)

Next, at step S122, the optimum data is stored in the storage section 14 as history data and then is supplied to the record power adjustment section 12, whereby an instruction is given so as to adjust the drive current Id based on the optimum data when actual information recording is executed, the pickup 3 is moved to the program area of the optical disk DSK, and a wait is made until actual information recording is started. The power calibration is now complete.

Although the emission power P of the semiconductor laser is optimized based simply on the β value in the related art, as described above, according to the embodiment, each actually provided modulation depth is compared with predetermined modulation depth threshold value THDk and the emission power P corresponding to the modulation depth of a larger value than the modulation depth threshold value THDk and providing the β value of the value closest to the target β value is determined the optimum emission power Popt for optimization, so that the emission power P can be optimized with extremely high accuracy as compared with the related art.

Further, if the characteristics of the components of the semiconductor laser, the optical system, the photodetector, etc., of the pickup 3 fluctuate due to a secular variation, etc., according to the embodiment, the emission power of the semiconductor laser can be optimized in conformity with the actual situation.

Further, the power calibration for CD-R has been described as a typical example, but optimum power calibration can also be conducted for other types of optical disks.

Further, even for the same type of optical disks, generally the circumstances at the information recording time vary from one optical disk to another in response to manufacturing variations at the manufacturing time, the operating environment of the user, etc. However, according to the embodiment, the emission power of the semiconductor laser is optimized in response to the actual circumstances and thus can be optimized in conformity with the actual situation.

In the description given above, the β value is adopted as the optimization condition, but the invention is not limited to it. The value of asymmetry (α value) previously described with reference to FIG. 13 may be applied as the feature information for optimization in place of the β value. In this case, the target β value data is previously stored in the storage section 14 as the target α value data and the power calibration is executed by applying the target a value data to the processing shown in FIGS. 4 to 7.

Second Embodiment

Next, a second embodiment of the invention will be discussed with reference to FIGS. 8 and 11. The configuration of an information record apparatus of the embodiment is similar to that previously described with reference to FIG. 1 and therefore will not be discussed again.

Figure 8:
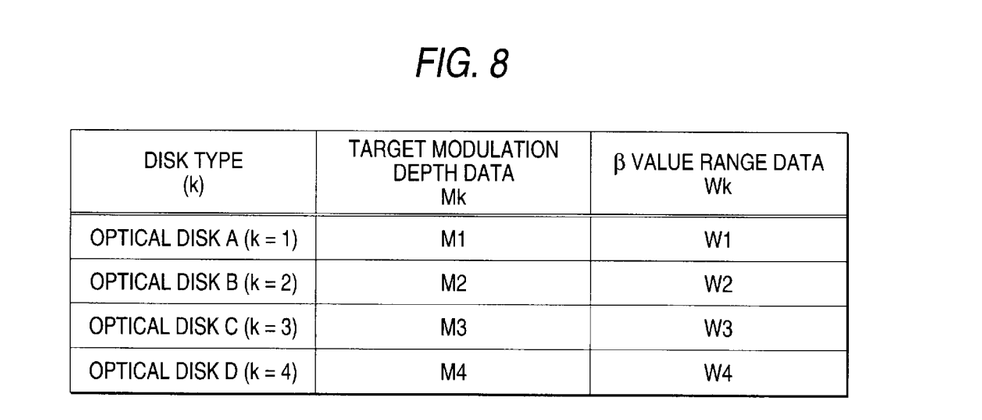
FIG. 8 is a drawing to show data stored in a storage section in a second embodiment of the invention.

In the embodiment, as shown in FIG. 8, target modulation depth data Mk and value range data Wk corresponding to various optical disk types are previously stored in the storage section 14 shown in FIG. 1 for each optical disk DSK type k.

Here, the target modulation depth data Mk is data indicating each modulation depth when calculation of the expression (3) shown above is performed based on the HF signal recorded in a state in which the record state of each type of optical disk satisfies the predetermined specification and a sufficient margin is taken for variations in record state; the target modulation data Mk is previously found by experiment.

As for the β value range data Wk, as the target modulation depth data Mk is found, calculation of the expression (1) shown above is performed based on the HF signal recorded in a state in which the record state of each type of optical disk satisfies the predetermined specification and a sufficient margin is taken for variations in record state to find each target β value, and the β value range data Wk is data indicating the range of β values in a predetermined range containing the target β values. The β value range data Wk is found by experiment for each optical disk type k and is recorded.

Figure 9:
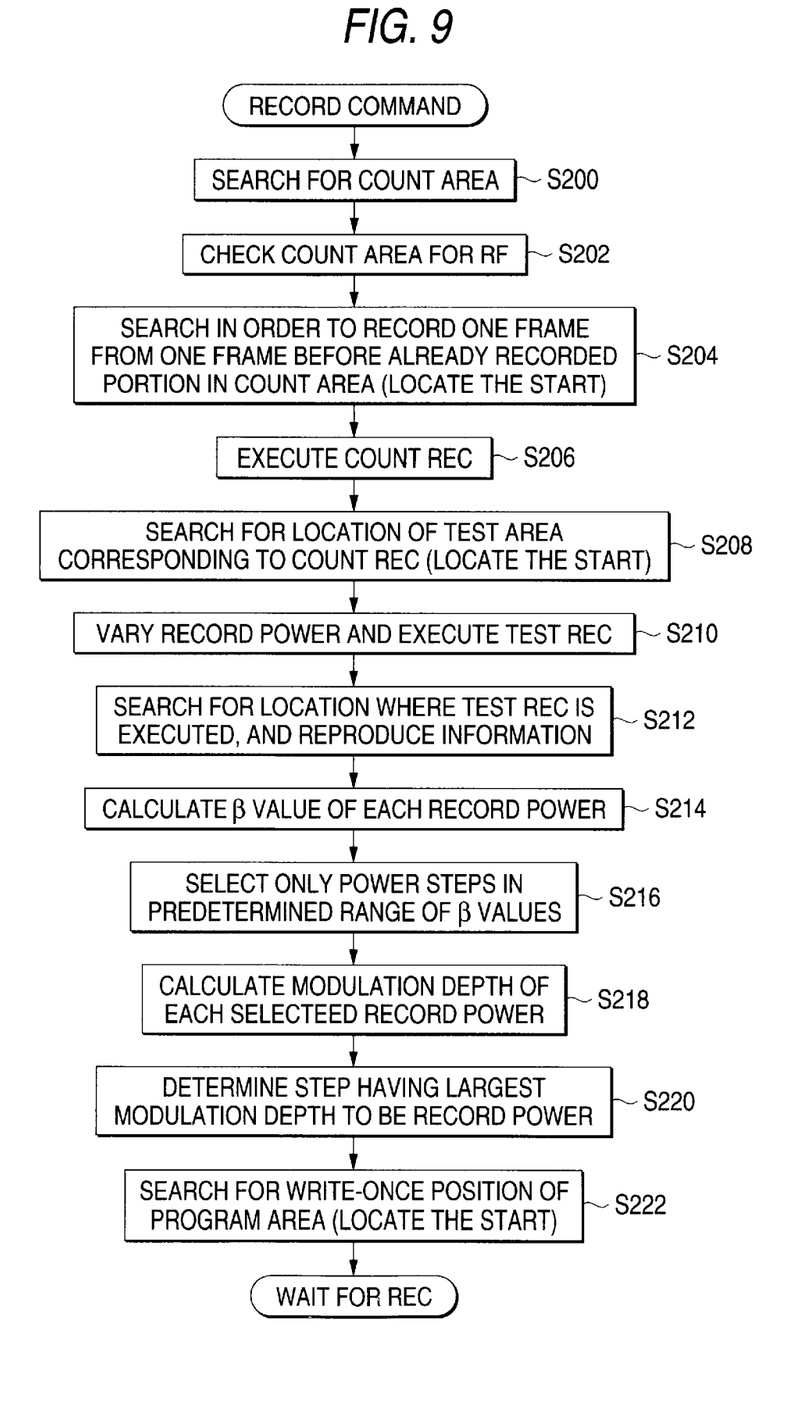
FIG. 9 is a flowchart to describe the operation of the second embodiment of the invention.

FIG. 9 is a flowchart to describe the operation for conducting power calibration for CD-R as a typical example.

In the figure, when the user gives an information record start command, power calibration is started. First, a pickup 3 is moved to the count area CA shown in FIG. 3 (step S200), and an already recorded part is checked by performing the above-described reproduction operation (step S202).

Next, a search is made for the top position to record one frame from one frame before the portion wherein data is already recorded in the count area CA for locating the start (step S204).

Next, the information record apparatus 1 is set to an information record mode and one frame length is recorded in the count area CA (step S206) and then the information record apparatus 1 is again set to an information reproduction mode before the pickup 3 is moved to the location of the test area TA corresponding to the frame recorded in the count area CA (step S208).

Next, the information record apparatus 1 is again set to the information record mode and a system controller 13 acquires n variable data pieces corresponding to the CD-R stored in the storage section 14 (Dc11, Dc21, . . . , Dcn1) and supplies the variable data pieces (Dc11, Dc21, . . . , Dcn1) to a record power adjustment section 12 in order every predetermined time, whereby the emission power P of the semiconductor laser is varied in the order of Pc1k, Pc2k, . . . , Pcnk and record pits at n steps are recorded and formed in the test area TA (step S210).

Next, the information record apparatus 1 is again set to the information reproduction mode and the pickup 3 is moved to the location where the record pits at n steps are recorded, and information is reproduced, whereby information of the record pits formed as trail write is detected (S212).

Accordingly, detection data DHF indicating top peak level a1 and bottom peak level a2 corresponding to the potential difference between the potential indicating the strength of reflected light from a record pit and the potential of AC ground GND is supplied to the system controller 13 for each of the record pits at the n steps, and further a modulation depth detection section 16 supplies detection data DRF of top peak level A1 and bottom peak level A2 of HF signal SHF to the system controller 13 for each of the record pits at the n steps.

Figure 10:
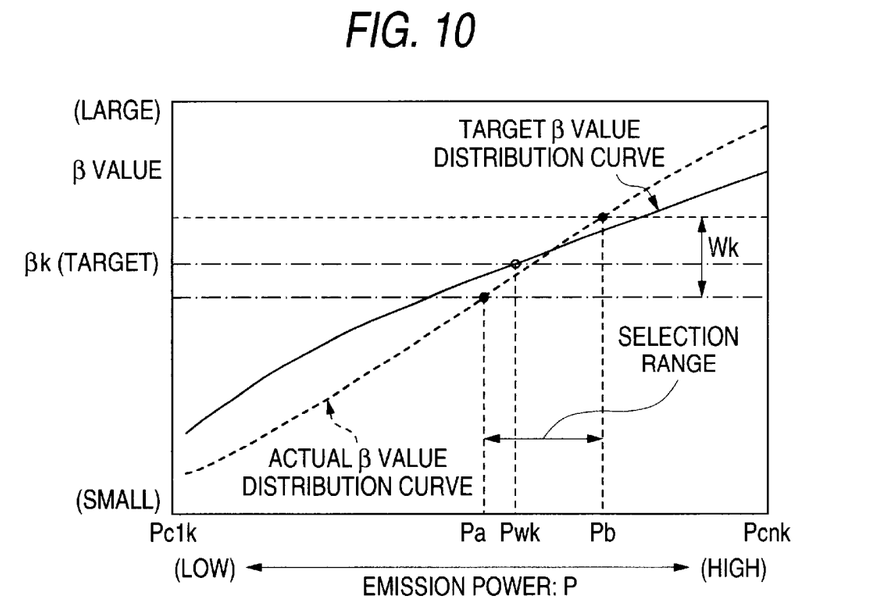
FIG. 10 is a drawing to describe the operation for selecting a predetermined β value based on β value range data from among the actual β values generated in the second embodiment of the invention.

Next, the system controller 13 calculates actual n β values β1k to βnk based on the detection data DHF at the n steps (step S214). Accordingly, a distribution curve of the β values as shown in FIG. 10 is provided.

Next, at step S216, the β value range data W1 corresponding to the CD-R is acquired from the storage section 14 and a β value contained in the range of the β value range data W1 (Wk=W1) is selected from among the calculated β values β1k to ink. Further, as shown in FIG. 10, emission powers Pa to Pb of semiconductor laser contained in the range of the β value range data W1 are selected and the variable data pieces corresponding to the inside of the range of the emission powers Pa to Pb are selected from among the variable data pieces (Dc11, Dc21, . . . , Dcn1) of the CD-R.

Next, at step S218, the modulation depths corresponding to the emission powers Pa to Pb are calculated based on the detection data DRF of the top peak level A1 and the bottom peak level A2 provided from the HF signal SHF for each of the emission powers Pa to Pb selected.

Figure 11:
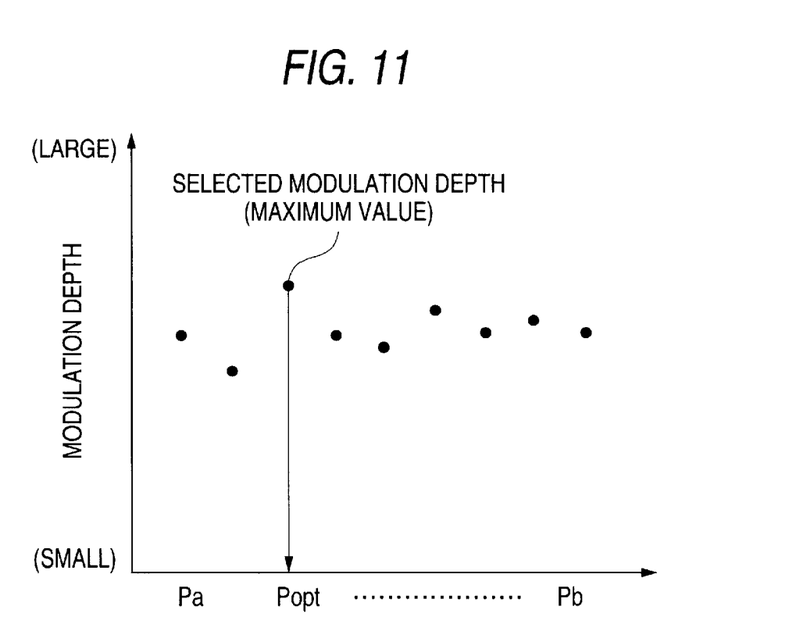
FIG. 11 is a drawing to describe the operation for determining the optimum emission power in the second embodiment of the invention.

Next, at step S220, the emission power showing the largest modulation depth is selected from among the modulation depths corresponding to the emission powers Pa to Pb selected, as shown in FIG. 11.

The predetermined target modulation depth data M1 corresponding to the CD-R may be acquired from the storage section 14 and each of the modulation depths corresponding to the selected emission powers Pa to Pb may be compared with the target modulation depth data M1 (Mk=M1) and the modulation depth of the value closest to the target modulation depth data M1 may be selected. If the modulation depth of the closest value is smaller than the target modulation depth data M1, the modulation depth of a value larger than and closest to the target modulation depth data M1 may be selected. Further, the modulation depth of a value larger than the target modulation depth data M1 may be selected.

The emission power corresponding to the selected modulation depth is determined optimum emission power Popt and further one variable data piece corresponding to the optimum emission power Popt is selected from among the variable data pieces (Dc11, Dc21, . . . , Dcn1) of the CD-R. The selected variable data piece is adopted as the data to set the optimum emission power (optimum data).

Next, at step S222, the optimum data is stored in the storage section 14 as history data and then is supplied to the record power adjustment section 12, whereby an instruction is given so as to adjust a drive current Id based on the optimum data when actual information recording is executed, the pickup 3 is moved to the program area of the optical disk DSK, and a wait is made until actual information recording is started. The power calibration is now complete.

Although the emission power P of the semiconductor laser is optimized based simply on the β value in the related art, as described above, according to the embodiment, a β value contained in the range of the β value range data Wk is selected from among the actually provided β values and the emission power P corresponding to the selected β value and providing the target modulation degree data Mk is determined the optimum emission power Popt for optimization, so that the emission power P can be optimized with extremely high accuracy as compared with the related art.

Also in the embodiment, the β value is adopted as the optimization condition, but the invention is not limited to it. The value of asymmetry (α value) may be applied as the feature information for optimization in place of the β value.

The first and second embodiments may be combined whenever necessary.

That is, in the first embodiment, one modulation depth threshold value data THDk is predetermined for each type of optical disk and the emission powers Ps to Pcnk corresponding to the actual modulation depths of larger values than the modulation depth threshold value data THDk are adopted as the selection range as shown in FIG. 6. However, based on the concept similar to that of the β value range data Wk described in the second embodiment, the above-described modulation depth threshold value data THDk may be replaced with modulation depth range data WTHDk representing a predetermined selection range and the emission power corresponding to the actual modulation depth corresponding to the inside of the range of the modulation depth range data WTHDk may be selected.

In the second embodiment, the β value range data Wk is predetermined for each type of optical disk and the emission powers Pa to Pb corresponding to the actual β values corresponding to the inside of the β value range data Wk are selected, as shown in FIG. 10. However, based on the concept similar to that of the modulation depth threshold value data THDk described in the first embodiment, the above-described β value range data Wk may be replaced with predetermined β value threshold value data βTHDk and the emission powers Ps to Pcnk corresponding to the actual β values of larger values than the β value threshold value data βTHDk may be adopted as the selection range.

Further, in the first or second embodiment, the information record apparatus implemented as hardware has been described, but the invention is not limited to it. For example, the hardware configuration of the information record apparatus of the first or second embodiment may be implemented as a computer program (emulator) and an electronic machine containing a microprocessor, such as a personal computer, may be controlled based on the computer program for delivering functions equal to those of the information record apparatus implemented as hardware.

The computer program may be recorded on an information record medium, such as CD (compact disk) or DVD (digital video disk or digital versatile disk), as an application file and the application file may be installed in or downloaded into an electronic machine such as a personal computer capable of playing back the information record medium for executing the computer program.

As described above, according to the invention, each actually provided modulation depth is compared with the predetermined threshold value and the emission power (write light power) corresponding to the modulation depth of a larger value than the modulation depth and corresponding to the feature information closest to the target feature information is determined appropriate write light power, whereby power calibration is conducted. Thus, extremely high-accuracy and appropriate power calibration is made possible as compared with power calibration conducted based on the β value or the value of asymmetry in the related art.

According to the information record apparatus having the configuration, the emission power (write light power) corresponding to the feature information in the predetermined range, of actually provided feature information and corresponding to the modulation depth of the largest value is determined appropriate write light power, whereby power calibration is conducted. Thus, extremely high-accuracy and appropriate power calibration is made possible as compared with power calibration conducted based on the β value or the value of asymmetry in the related art.

Accordingly, for example, when information is reproduced with a playback-only pickup with the modulation depth made lower than that of a write pickup because of the difference in the numerical aperture (NA) of a lens placed in pit read pickup or if worsening, etc., of a reproduction (playback) condition such as dirt or secular degradation of the lens of the read pickup, performance variations, adjustment variations, etc., occurs, information can be recorded under a better condition of the modulation depth and thus it is made possible to suppress the defective condition of playability of a recordable optical information record medium.

What is claimed is:

1. An information record apparatus for adjusting emission power of write light on to an optical information record medium, the information record apparatus comprising:

a light source for emitting a plurality of write light each different in emission power;

a power adjustment section for adjusting the emission power of each of the plurality of write light;

a write section for applying the plurality of write light to form a plurality of record pits in the optical information record medium;

a feature extraction section for optically reproducing a record state containing the record pits to produce a signal waveform, the feature extraction section for extracting feature information of the record state for each of the record pits based on the signal waveform;

a detection section for detecting a modulation depth of each of the plurality of the write light based on the signal waveform;

a selection section for selecting power of the write light corresponding to the modulation depth of a larger value than a predetermined threshold value; and a determination section for selecting the feature information corresponding to the power of the light write selected by the selection section from among the feature information extracted by the feature extraction section, the determination section for determining that the power of the write light corresponding to the feature information closest to target feature information of a predetermined record state, of the selected feature information is appropriate write light power, wherein the power adjustment section adjusts the emission power of the light source based on the power of the write light determined to be appropriate by the determination section.

2. The information record apparatus as claimed in claim 1 wherein the feature information is a β value.

3. The information record apparatus as claimed in claim 1 wherein the feature information is a value of asymmetry.

4. An information record apparatus for adjusting emission power of write light onto an optical information record medium, the information record apparatus comprising:

a light source for emitting a plurality of write light each different in emission power;

a power adjustment section for adjusting the emission power of each of the plurality of write light;

a write section for applying the plurality of write light to form a plurality of record pits in the optical information record medium;

a feature extraction section for optically reproducing a record state containing the record pits to produce a signal waveform, the feature extraction section for extracting feature information of the record state for each of the record pits based on the signal waveform;

a detection section for detecting a modulation depth of each of the plurality of the write light based on the signal waveform;

a selection section for selecting the power of the write light corresponding to the feature information in a predetermined range; and a determination section for determining that the power of the write light, of the powers of the write light selected by the selection section, corresponding to the modulation depth of the largest value, of the modulation depths detected by the detection section is appropriate write light power, wherein the power adjustment section adjusts the emission power of the light source based on the power of the write light determined to be appropriate by the determination section.

5. The information record apparatus as claimed in claim 4 wherein the feature information is a β value.

6. The information record apparatus as claimed in claim 4 wherein the feature information is a value of asymmetry.

7. An information record method for adjusting power of write light onto an optical information record medium, the information record method comprising the steps of:

applying a plurality of write light each different in emission power from a light source to forme a plurality of record pits in the optical information record medium;

optically reproducing a record state containing the record-pits from the optical information record medium to produce a signal waveform;

extracting feature information of the record state for each of the record pits based on the signal waveform;

detecting a modulation depth of the write light for each of the plurality of write light based on the signal waveform;

selecting the power of the write light corresponding to the modulation depth of a larger value than a predetermined threshold value;

selecting the feature information corresponding to the selected power of write light from among the extracted feature information;

determining that the power of the write light corresponding to the feature information closest to target feature information of a predetermined record state, of the selected feature information is appropriate write light power; and adjusting the emission power of the light source based on the power of the write light determined to be appropriate.

8. An information record method for adjusting power of write light onto an optical information record medium, the information record method comprising the steps of:

applying a plurality of write light each different in emission power from a light source to form a plurality of record pits in the optical information record medium;

optically reproducing a record state containing the record pits from the optical information record medium to produce a signal waveform;

extracting feature information of the record state for each of the record pits based on the signal waveform;

detecting a modulation depth of the write light for each of the plurality of write light based on the signal waveform;

selecting the powers of the write light corresponding to the feature information in a predetermined range;

determining that the power of the write light of the selected powers of the write light, corresponding to the modulation depth of the largest value, of the detected modulation depths is appropriate write light power; and adjusting the emission power of the light source based on the power of the write light determined to be appropriate.

9. An information record medium recording a control information program to be executed in a computer, the control information program comprising:

applying a plurality of write light each different in emission power from a light source to forme a plurality of record pits in the optical information record medium;

optically reproducing a record state containing the record pits from the optical information record medium to produce a signal waveform;

extracting feature information of the record state for each of the record pits based on the signal waveform;

detecting a modulation depth of the write light for each of the plurality of write light based on the signal waveform;

selecting the power of the write light corresponding to the modulation depth of a larger value than a predetermined threshold value;

selecting the feature information corresponding to the selected power of write light from among the extracted feature information;

determining that the power of the write light corresponding to the feature information closest to target feature information of a predetermined record state, of the selected feature information is appropriate write light power; and adjusting the emission power of the light source based on the power of the write light determined to be appropriate.

10. An information record medium recording a control information program to be executed in a computer, the control information program comprising:

applying a plurality of write light each different in emission power from a light source to form a plurality of record pits in the optical information record medium;

optically reproducing a record state containing the record-pits from the optical information record medium to produce a signal waveform;

extracting feature information of the record state for each of the record pits based on the signal waveform;

detecting a modulation depth of the write light for each of the plurality of write light based on the signal waveform;

selecting the powers of the write light corresponding to the feature information in a predetermined range;

determining that the power of the write light of the selected powers of the write light, corresponding to the modulation depth of the largest value, of the detected modulation depths is appropriate write light power; and adjusting the emission power of the light source based on the power of the write light determined to be appropriate.

* * * * *